(12) United States Patent
Noone et al.

(10) Patent No.: US 6,396,216 B1
(45) Date of Patent: May 28, 2002

(54) LAMP FAULT DETECTION

(75) Inventors: Sean Noone; Thomas Durkan, both of County Mayo; Michael Quinlan; Paul Mc Carthy, both of County Limerick, all of (IE)

(73) Assignee: Noontek Limited, Bullmellet (IE)

( * ) Notice: Subject to any disclaimer, the term of this patent is extended or adjusted under 35 U.S.C. 154(b) by 0 days.

(21) Appl. No.: 09/700,466

(22) PCT Filed: May 17, 1999

(86) PCT No.: PCT/IE99/00044

§ 371 (c)(1),
(2), (4) Date: Dec. 4, 2000

(87) PCT Pub. No.: WO99/60826

PCT Pub. Date: Nov. 25, 1999

(30) Foreign Application Priority Data

May 15, 1998 (IE) .............................................. S980369

(51) Int. Cl.⁷ .............................................. H05B 37/00
(52) U.S. Cl. ........................ 315/119; 315/292; 315/312; 315/360; 315/362
(58) Field of Search ................................ 315/119, 122, 315/127, 129–131, 86, 292, 312, 316, 324, 360, 362

(56) References Cited

U.S. PATENT DOCUMENTS 4,383,240 A * 5/1983 Staats, Jr. ............... 315/132 X
4,945,280 A * 7/1990 Beghelli ....................... 315/129
5,397,963 A * 3/1995 Manson ....................... 315/129
5,479,159 A * 12/1995 Kelly et al. ............. 315/127 X

FOREIGN PATENT DOCUMENTS

| EP | 2205014 | 12/1986 |
| EP | 0537651 A2 | 4/1993 |
| EP | 0582287 A2 | 2/1994 |
| FR | 2622749 | 5/1989 |
| FR | 2665032 | 1/1990 |
| GB | 2222245 A | 2/1990 |
| WO | WO 9216086 | 9/1992 |

* cited by examiner

*Primary Examiner*—Haissa Philogene
(74) *Attorney, Agent, or Firm*—Burns, Doane, Swecker & Mathis, LLP

(57) ABSTRACT

A fault detection apparatus for a public lighting system has a number of lamps. Each lamp incorporates an operating and control circuit which will emit signals on a fault occurring or conditions arising indicating a potential fault, for example, of a gas discharge tube forming part of the lamp. The apparatus, which can be incorporated in the lamp operating and control circuit or be provided as a separate plug in unit incorporates a host interface. A control unit and an externally visible signalling device such as a flag or flashing beacon will allow the detection of a fault or potential fault for example during normal daylight hours.

20 Claims, 12 Drawing Sheets

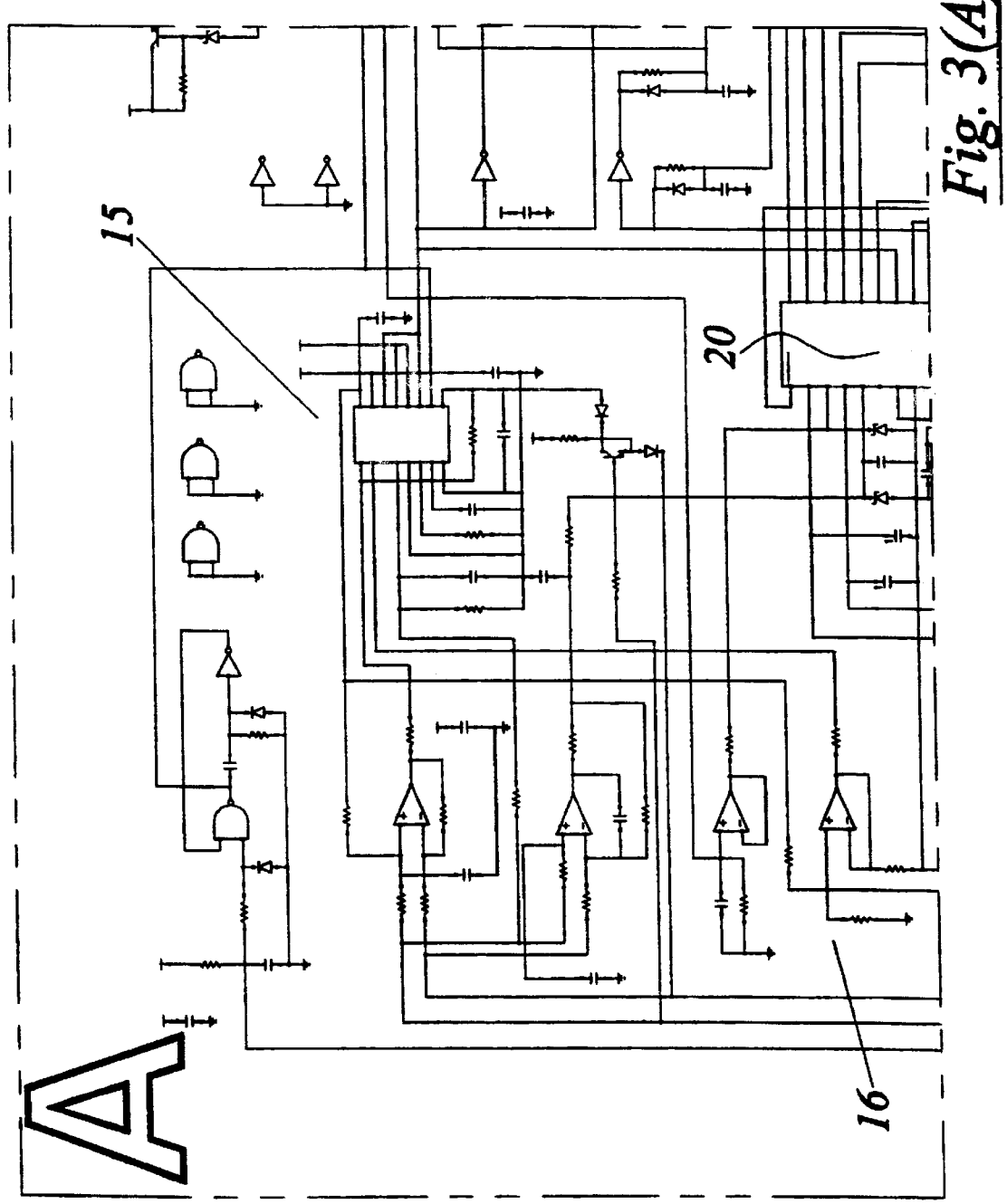

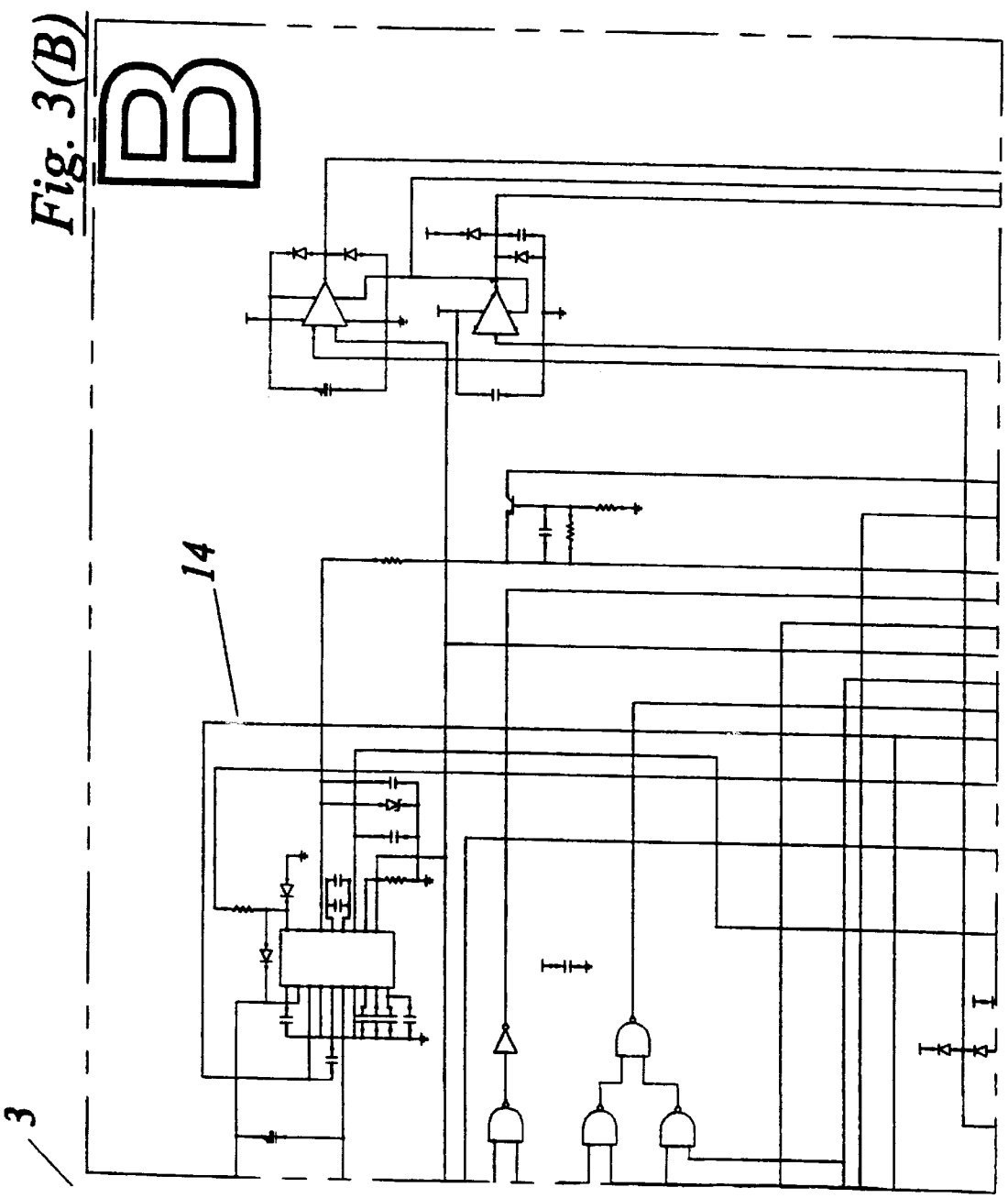

LAMP FAULT DETECTION

FIELD OF THE INVENTION

The present invention relates to a fault detection apparatus for a public lighting system of the type having a plurality of lamps, each lamp including an operating and control circuit incorporating fault detection signalling for various portions of the operating and control circuit.

BACKGROUND OF THE INVENTION

Essentially the term 'public lighting system' is used here to encompass not exclusively public lighting per se as would be considered to be the meaning of it, but lighting systems for installations whether they be industrial premises, government installations, sporting arenas or the like generally extensive areas, all of which tend to have a large number of lamps operating. Most such lamps have as their source of luminescence a gas discharge tube and this latter term is used to describe the actual source of the light flux in the lamp but obviously other sources could be used.

In this specification the term "fault" is used to indicate an actual fault which causes failure of the system, a fault which causes inefficient operation of the system or indeed an imminent fault that hasn't as of yet caused any serious malfunction of the system, but which has produced a condition in the system which indicates the possibility that such a fault may arise.

Inevitably lamps fail either due to the simple wearing out of the gas tube or some other failure in the operating and control circuit. Indeed lamps regularly fail prematurely due to incorrect power supply either caused by mains faults or, for example, faulty ballasts or igniters in the operating and control circuit.

Additionally, the lamps often suffer, as they get older, from cycling which causes the lamp to flicker on and off before failing completely and this is an exceedingly undesirable situation to occur.

There are many available lamp control circuits at present, such as, for example, described in European patent Specification No. 0 582 287 (Smeasit S.r.l.). This specification describes an internal auto-diagnostics program for a lamp operating a control circuit, which by means of a modem or radio link reports detected faults to an operations centre. While similar systems are known which provide even adjustment for individual lamps in certain situations, all the systems to date require some form of central host processor which collects and identifies the faults such as that of this European specification. This is relatively complex and expensive and is not suitable for retro-fitting.

SUMMARY OF THE INVENTION

What is needed is some relatively simple system or apparatus, whereby maintenance personnel can be alerted to the failure or imminent failure of individual lamps. Ideally, such apparatus should be able to discriminate between the types of failure. For example, the fault could occur in a ballast, which fault would need to be rectified, but would not need to be urgently rectified, while the failure of a bulb or the cycling of a lamp must be rectified as quickly as possible.

Unless some elaborate detection system for faults is incorporated in the public lighting system such as described above the only way of detecting an actual failure of a lamp is by visual inspection of the lamp when it is operating. Potential or imminent failure can only in these circumstances be detected by physically testing the operating and control circuits in situ on a regular basis. The former is extremely expensive to do, but must be done, while the latter though not essential and costly is often necessary as neglect is even more costly.

Thus, there is a need for an apparatus which will allow a fault to be easily efficiently detected at times which are suitable for such detection. Further such an apparatus should be easily incorporated in existing public lighting systems.

Further, there is a need for an apparatus which will allow the fault to be readily easily detected at times that are suitable for such inspection.

According to the invention there is provided a fault detection apparatus for a public lighting system of the type having a plurality of lamps, each lamp including an operating and control circuit incorporating fault detection signalling for various portions of the operating and control circuit characterised in that the fault detection apparatus comprises:

a host interface for connection to the lamp operating and control circuit for the reception of fault detection signals;

a control unit for reception of the fault detection signal; and an externally visible signalling device connected to the control unit and operable by the control unit to signal the fault.

The invention provides that the signalling device may be a flag or a signalling beacon. Both of these have their advantages. The use of a flag is simple, it is a well known piece of apparatus that is used on many types of switchgear and can be easily seen. However, beacons have other advantages in that they are more clearly visible and can be operated in such a way as to attract attention, such as, for example, by causing them to flash on and off. Thus reporting of a fault does not necessary have to be reported by somebody solely allocated this task, but may, for example, be made by other employees or simply the general public.

Ideally there is provided additional signalling means for sending the fault detection signal to a host control station, which signalling means can provide a short range radio signal for sending the fault detection signal to a remote but relatively near host station.

Indeed the host station does not have to be a central host station, but can be a hand-held device. Thus, for example, maintenance personnel or other employees travelling in a particular area can query detection apparatus within a local area to ascertain whether any are showing a fault or not. The advantage of this is that such a signalling means and associated hand held device need only be fitted to and used with selected lamps in a system which lamps can be chosen depending on their relative importance to the overall lighting system.

In one embodiment of the invention, the fault detection apparatus is housed in a separate plug in unit for connection to the lamp. This allows for retro-fitting.

Ideally the control unit includes analysis means for fault detection signals to identify a particular fault and to cause the signalling device to emit a signal indicating the said fault. The advantage of this is that maintenance personnel can be alerted to the seriousness of the fault or potential fault. In certain cases this might require immediate maintenance attention such as the replacement of the lamp, while in other cases it might be possible simply to note the fault or imminent fault and to plan some routine maintenance.

In another embodiment of the invention the control unit includes means for deactivating the lamp in response to the identification of a fault. The advantage of this is that if the fault is serious then automatically the lamp can be deactivated such as, for example, a lamp that is cycling.

The control unit may incorporate an oscillating circuit or an opto-coupler, both of these are suitable ways of operating the device.

Ideally the signalling device is a high intensity light source, which may, for example, emit a coloured light which can change depending on the fault identified. There are obvious advantages to these.

The control unit includes an additional indicator lamp to signal correct operation of the circuit and the signalling device. The advantage of this is that routine inspection will show if by any chance the fault detection apparatus is inoperative.

Ideally the control unit includes additional control means to only operate the signalling device during certain times. There is absolutely no point in having the signalling device operating in many instances throughout the night and only needs to be operated when people can see it, or are likely to be inspecting it.

Similarly, in one embodiment the control unit includes light sensors to control the level of light during which the signalling device operates. Again this just merely means that the time in which, for example, a beacon can be illuminated is controlled and thus there is no wastage of power. Indeed in relation to this ideally the signalling means operates in a low power mode.

BRIEF DESCRIPTION OF THE DRAWINGS

The present invention will be more clearly understood from the following description of some embodiments thereof, given by way of example only described with reference to the accompanying drawings in which:

FIGS. 3(a) to 3(d) are enlargements of similarly identified portions of FIG. 3;

DETAILED DESCRIPTION OF THE INVENTION

Figure 1:
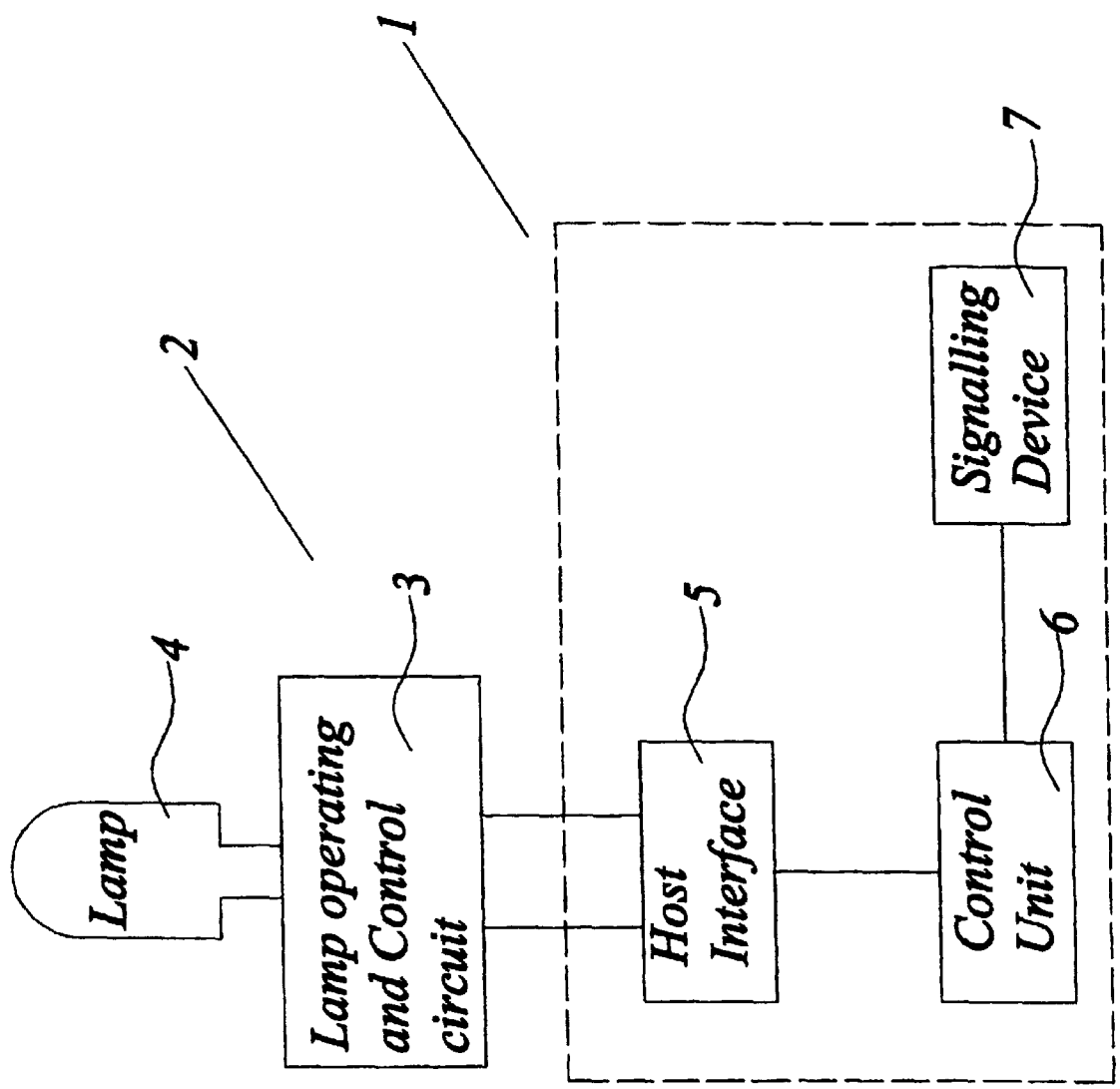
FIG. 1 is a functional block diagram of the invention.

Referring to the drawings and initially to FIG. 1 there is illustrated a fault detection apparatus, indicated generally by the reference numeral 1 and a lamp indicated generally by the reference numeral 2 forming part of a public lighting system. The lamp 2 comprises a lamp operating and control circuit 3 and a gas discharge tube 4.

The fault detection apparatus 1 comprises a host interface 5 for connection to the lamp operating and control circuit 3 for the reception of fault detection signals. The fault detection apparatus 1 further includes a control unit 6 connecting to the host interface, which, in turn, is connected to an externally visible signaling device 7. As will be described hereinafter, the signaling device can be a conventional flag or a signaling beacon.

A specific construction of fault detection apparatus is described in some detail below however it will be apparent that the technology to capture, analyse and process such fault signals is readily available and does not require an elaborate or exhaustive description.

In operation, the lamp 2 operates in normal manner until a fault is detected in the lamp operating and control circuit 3. When a fault, which can be an imminent fault, as mentioned above, is identified in the lamp operating and control circuit 3 a signal is sent through the host interface 5 to the control unit 6 which then causes the signaling device to emit the appropriate signal. The signaling device will, as mentioned above, give a clearly visible signal. This visible signal can allow the detection and recordal of faults during daylight hours when the public lighting system is not operating. Further it does not require the use of technically trained or indeed specifically appointed employees, but can be detected by concerned employees.

Figure 2:
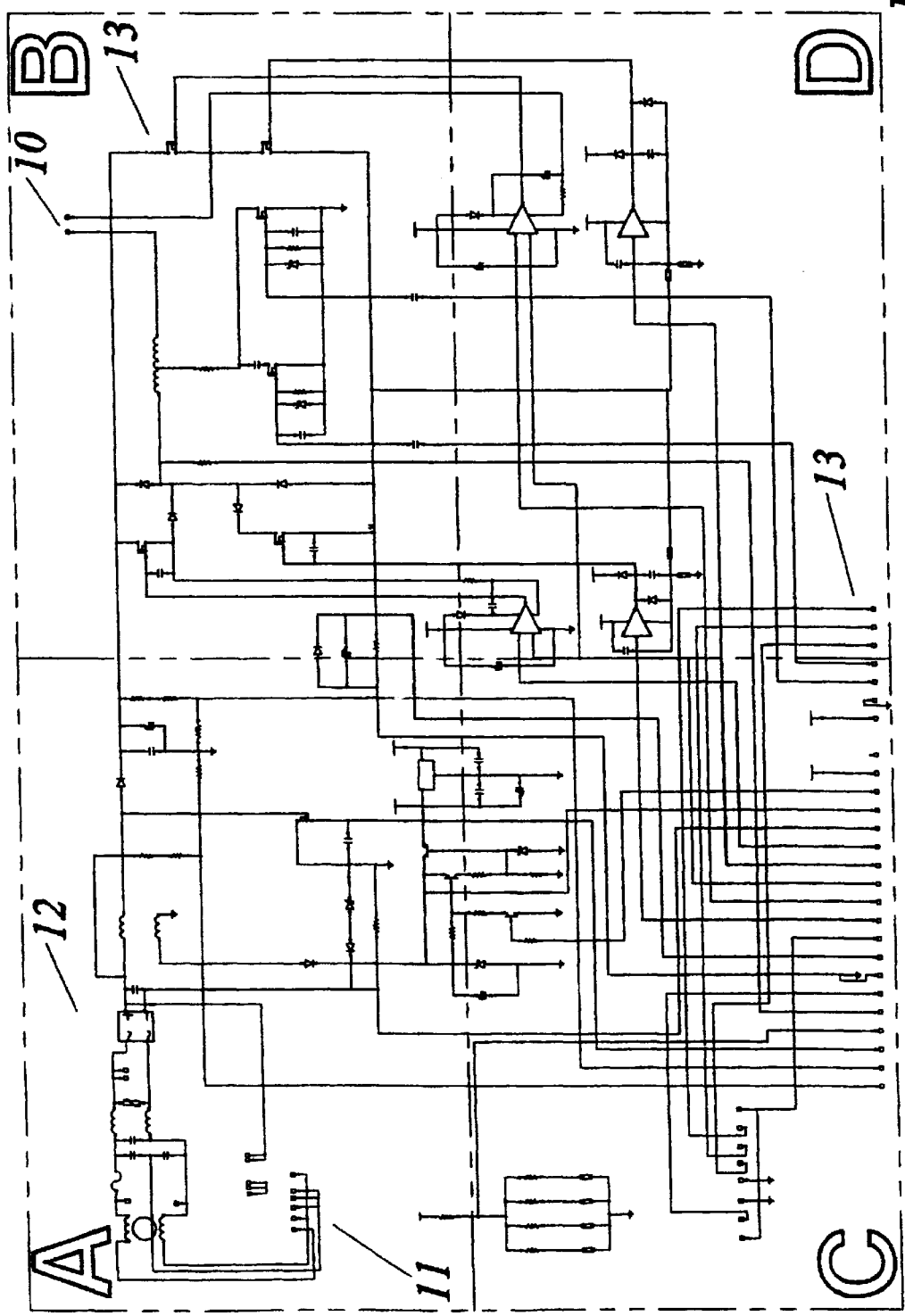
FIG. 2 is portion of an operating and control circuit for a gas discharge lamp.
Figure 2A:
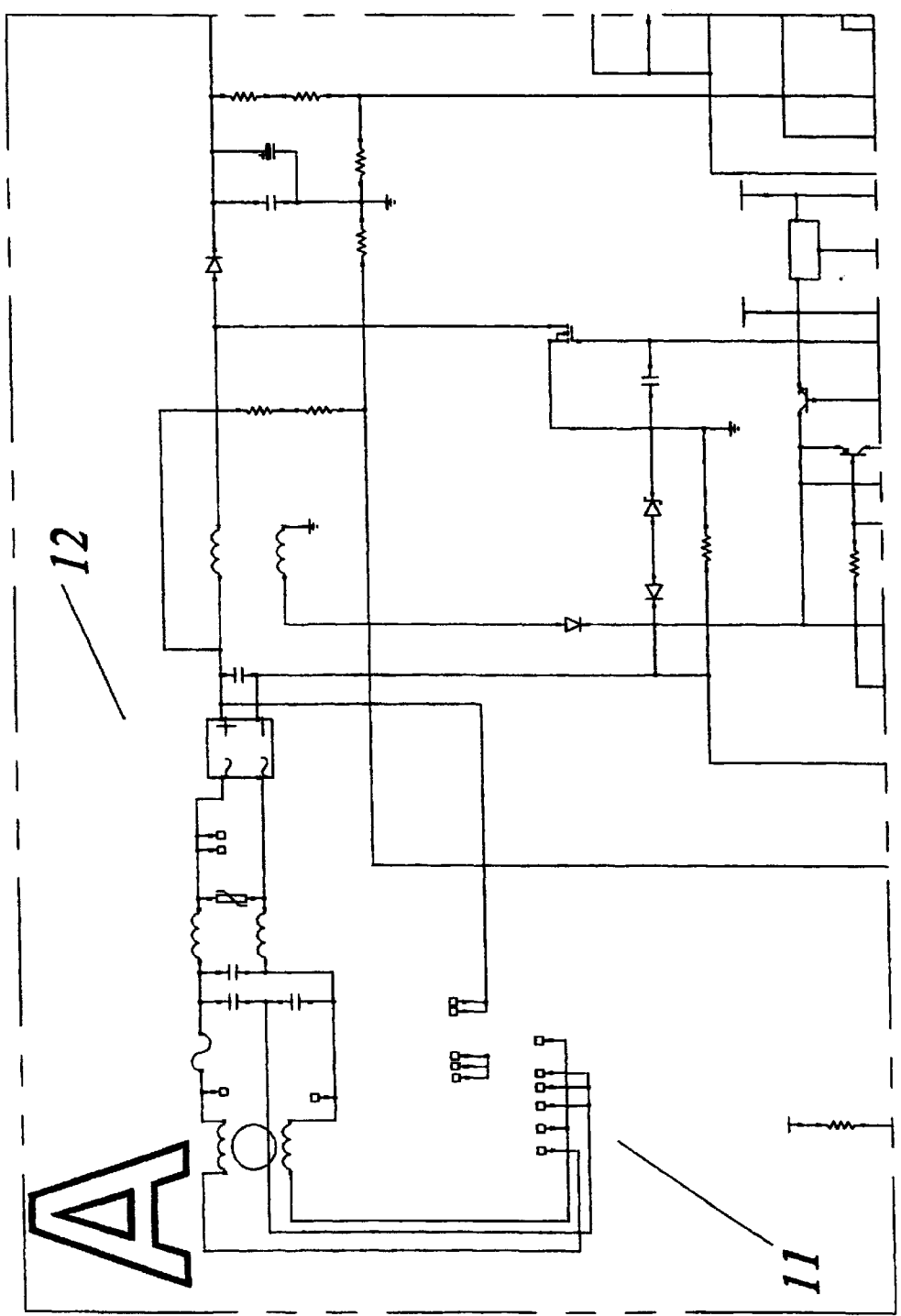
FIGS. 2(a) to 2(d) are enlargements of the similarly identified portions of FIG. 2.
Figure 2B:
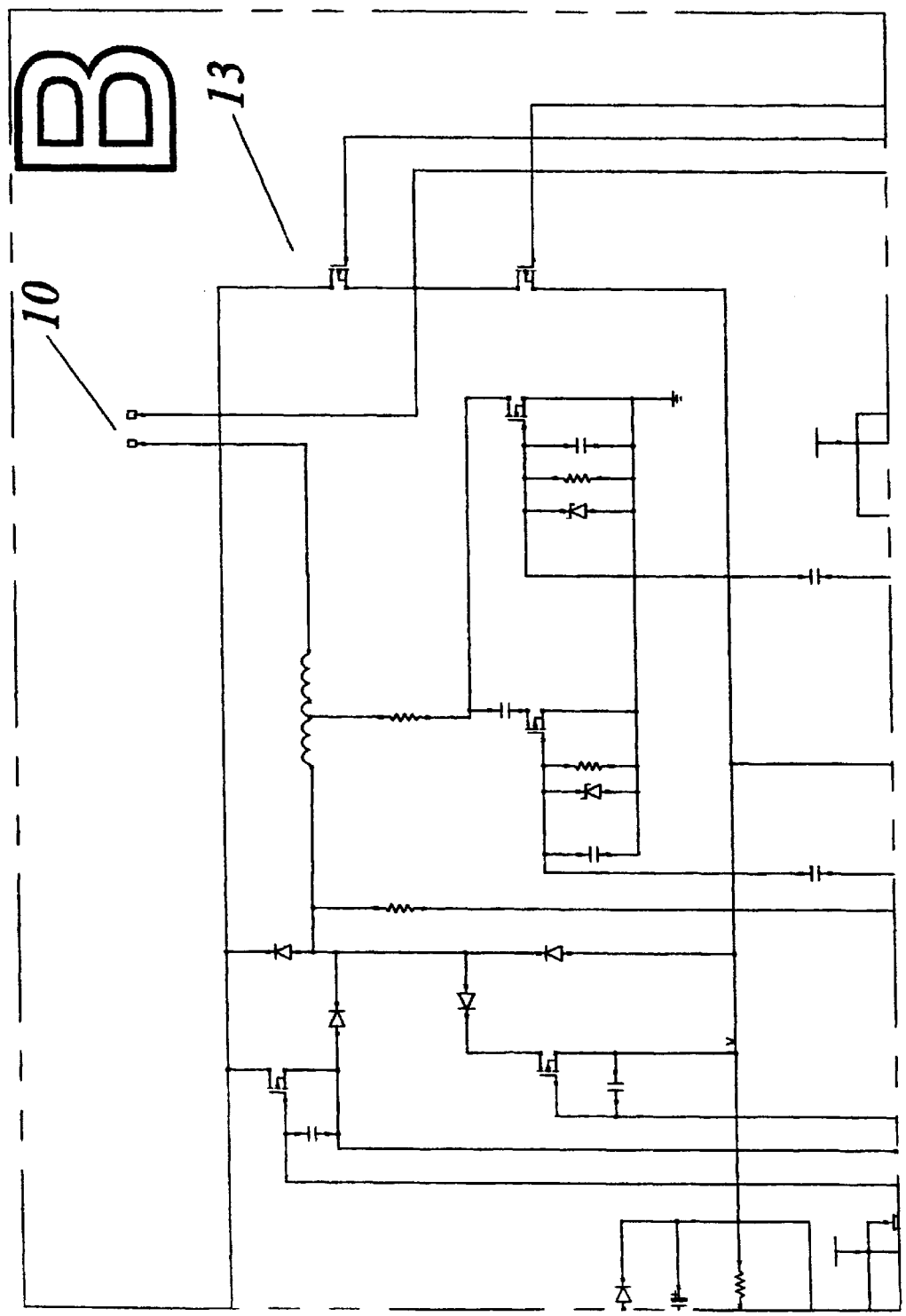
Figure 2C:
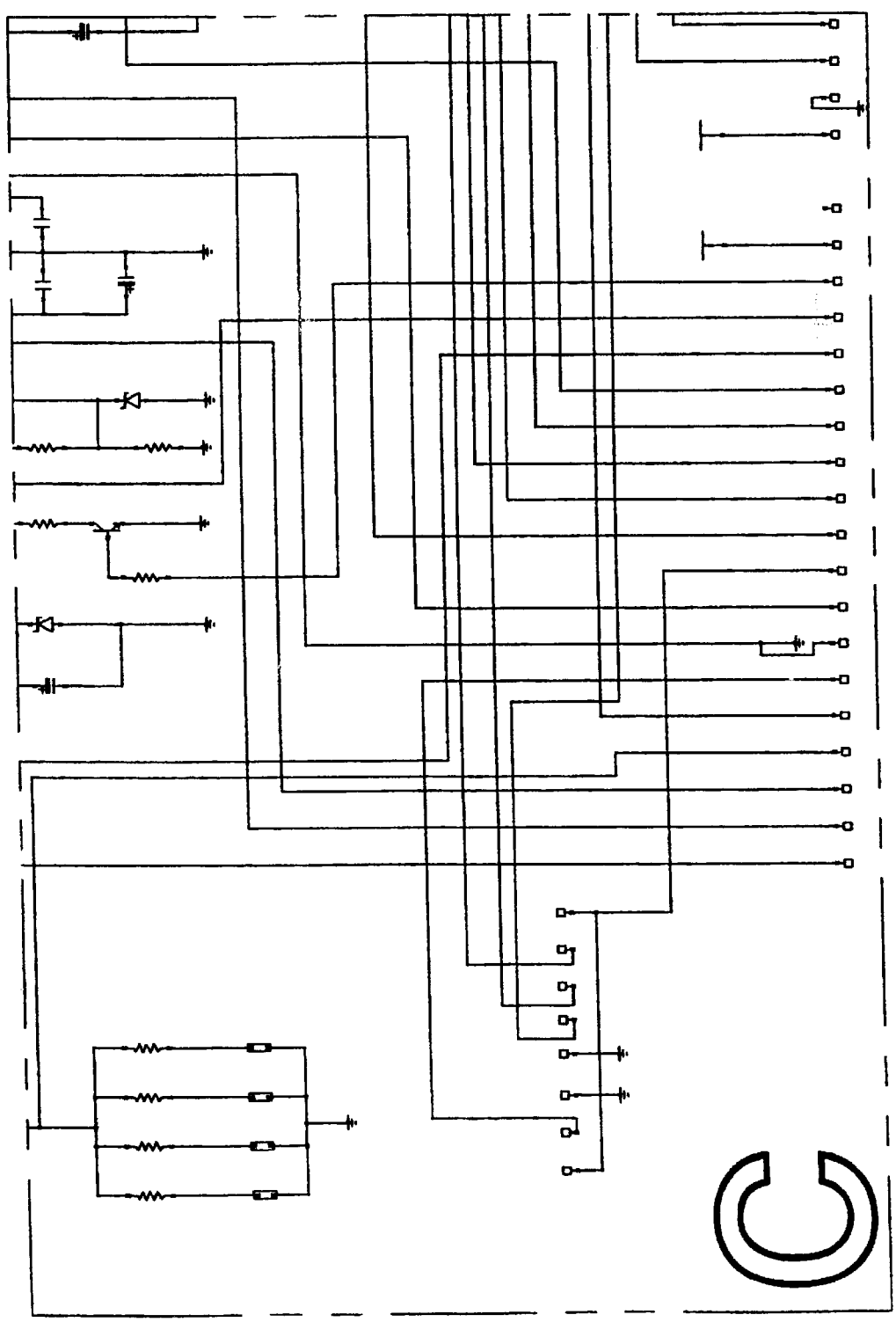
Figure 2D:
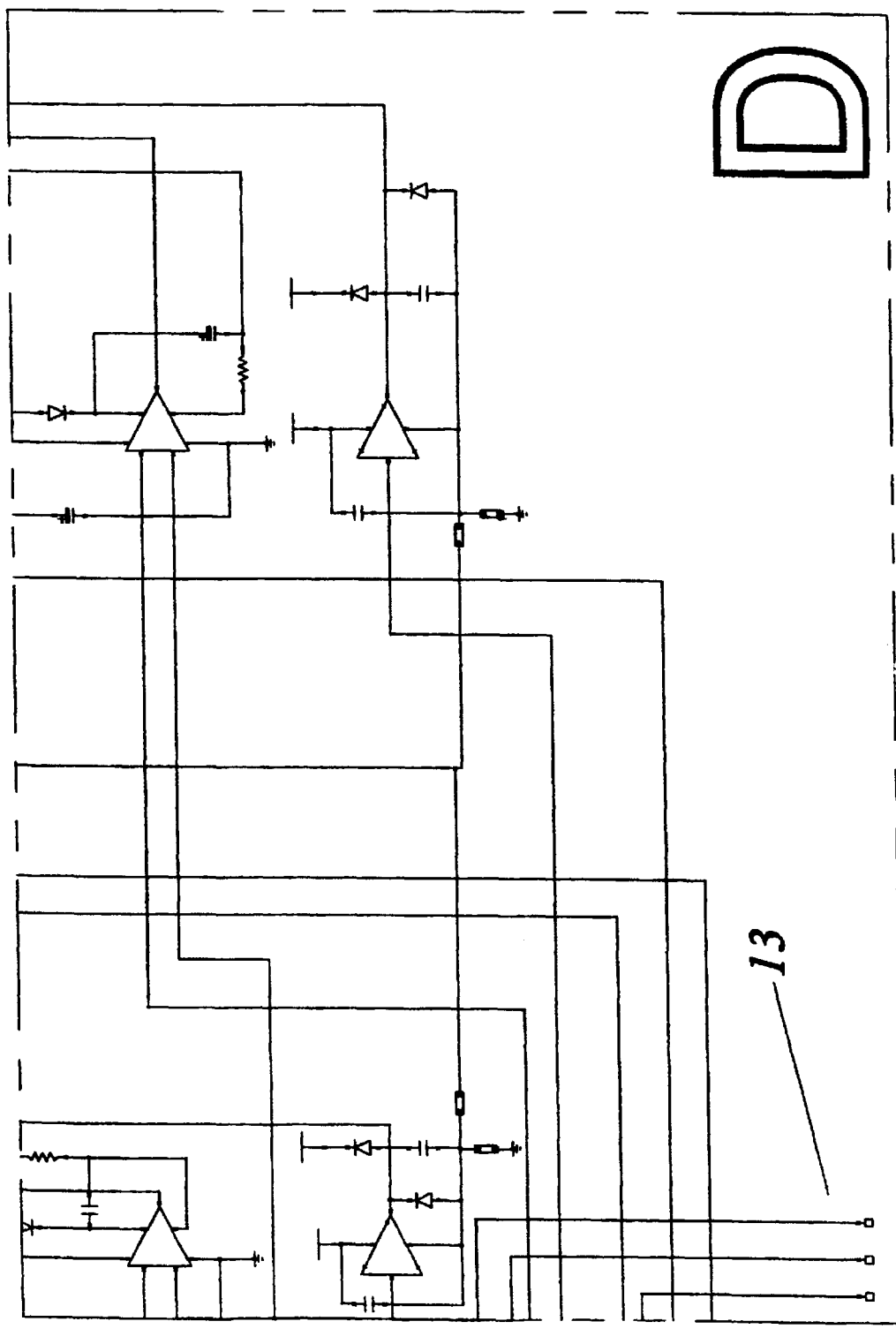
Figure 3:
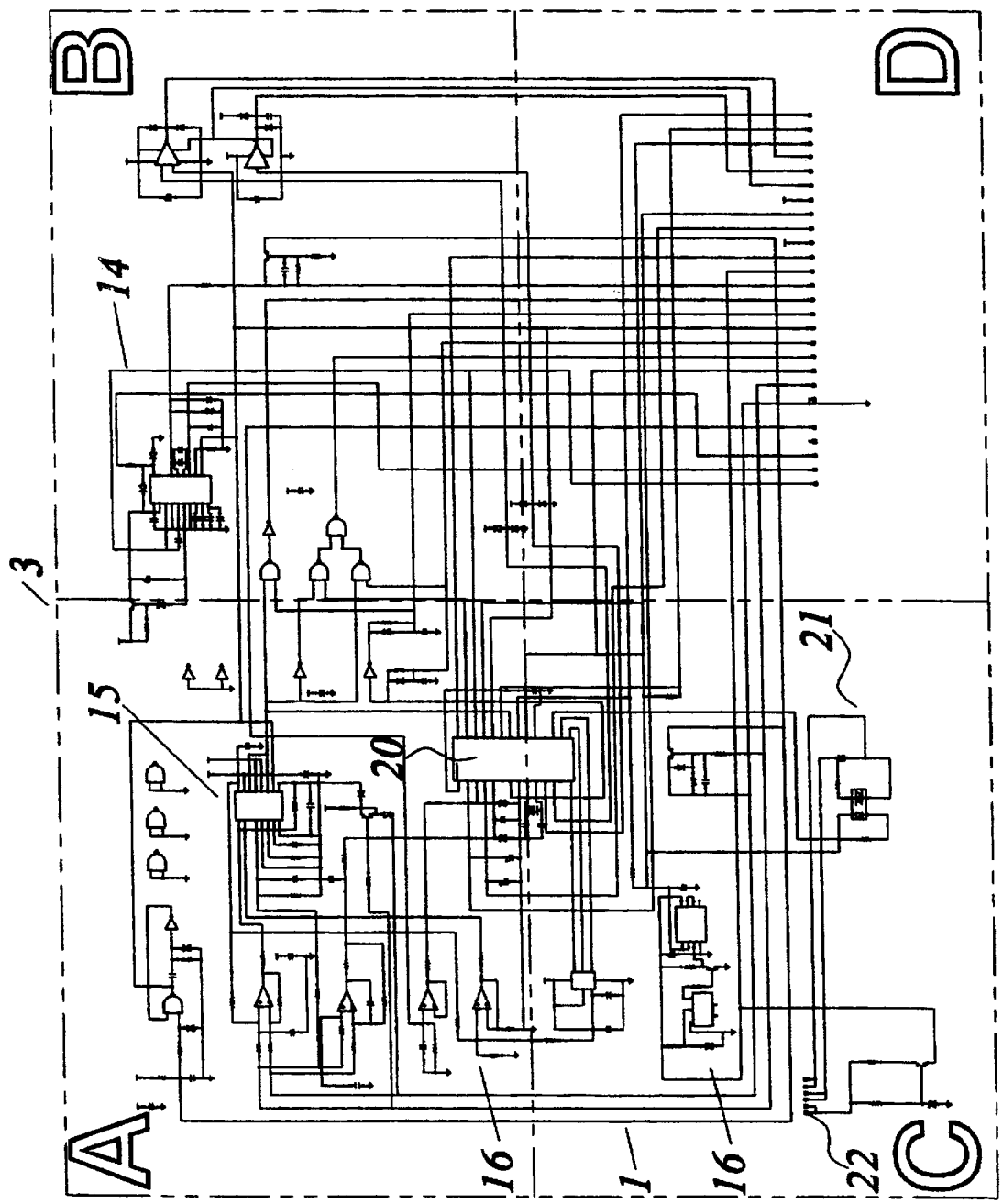
FIG. 3 illustrates a further part of the operating and control circuit for the lamp incorporating fault detection apparatus according to the present invention.
Figure 3C:
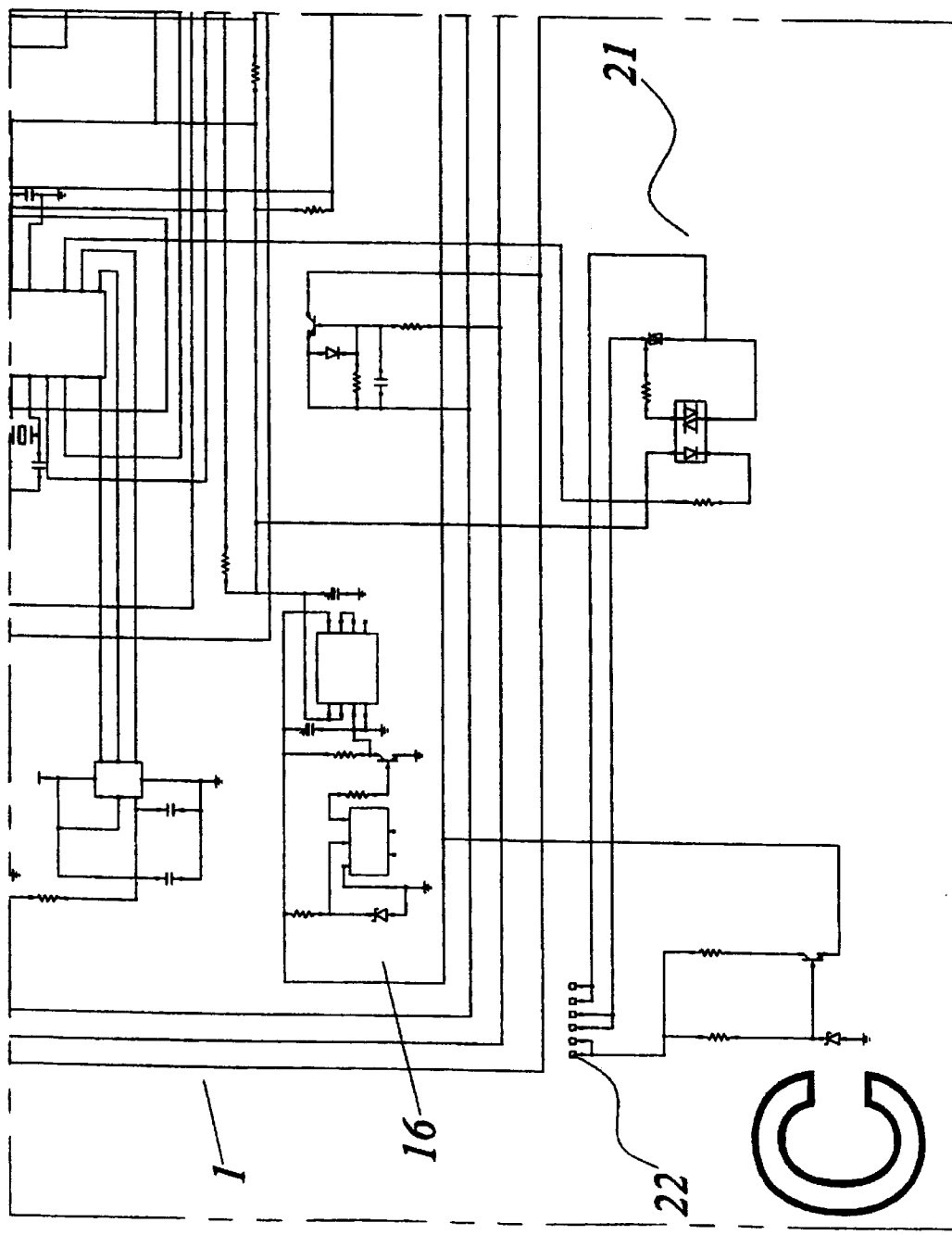
Figure 3D:
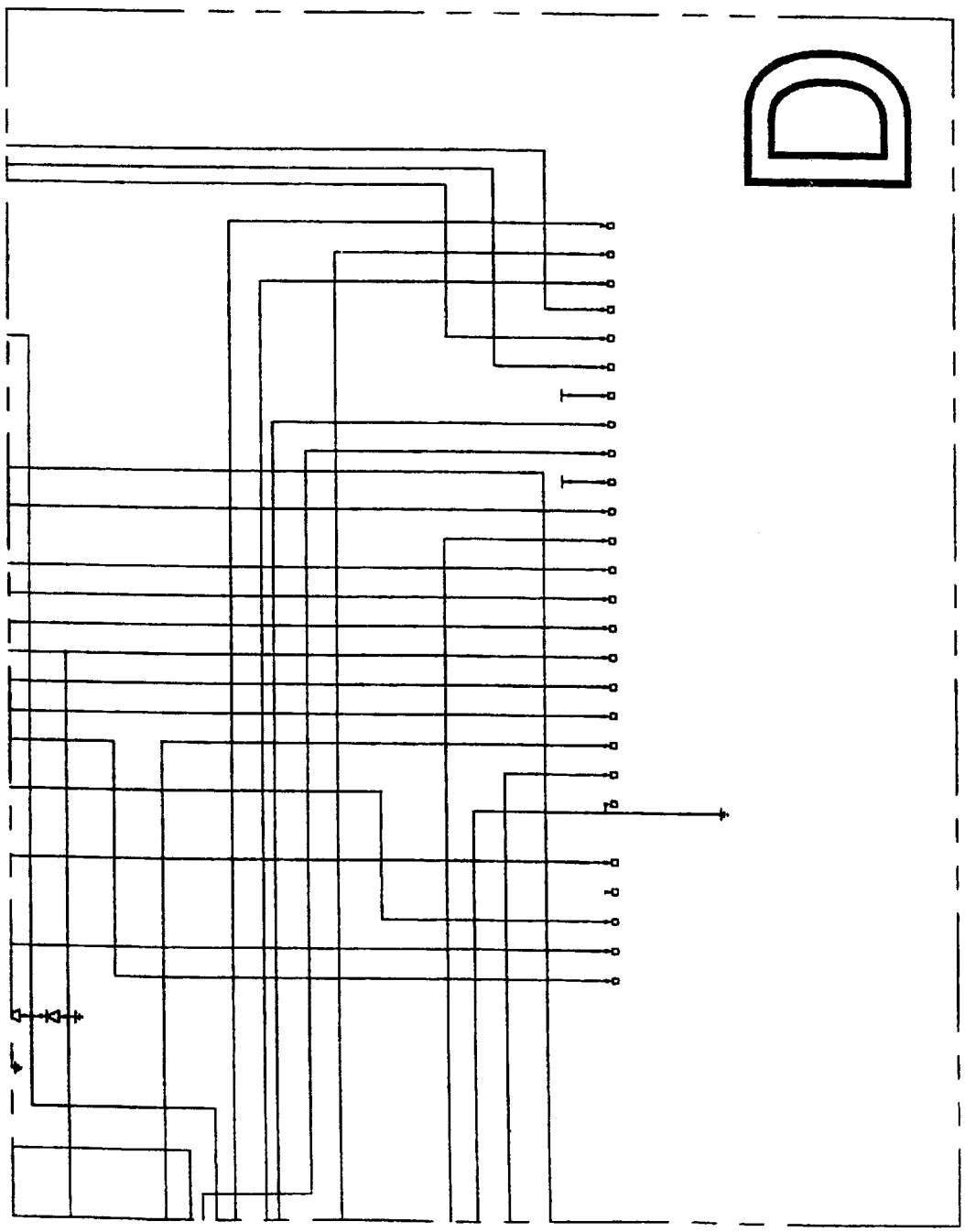

Referring now to FIGS. 2 and 3 there is illustrated a lamp operating and control circuit 3 in detail which incorporates in It the fault detection apparatus of the present invention.

Referring firstly to FIG. 2 and FIGS. 2(a) to 2(d), the lamp operating and control circuit is again identified by the reference numeral 3 and the gas discharge lamp 4 is not shown, but would be connected to contacts 10. The mains input is indicated at 11 and as is conventional the mains feed is a full wave rectifier indicated generally by the reference numeral 12. The remainder of the circuit illustrated in FIG. 2 is a particularly useful and innovative way of operating and controlling the lamp and is the subject of a co-pending patent application. However, a description of this, its features and advantages are irrelevant to the present invention. Any well known circuitry for lamp control and operation would be equally applicable to the present invention. Similar remarks apply to portions of the remainder of the circuit illustrated in FIG. 3. At 13 is indicated the connection between the circuit of FIG. 2 and of FIG. 3. The same reference numeral appears on each drawing.

Referring now to FIG. 3 and FIGS. 3(a) to 3(d), the lamp operating and control circuit 3 includes a power factor control indicated generally by the reference numeral 14 and a pulse width modulator indicated generally by the reference numeral 15. A lamp monitoring circuit indicated generally by the reference numeral 16 is provided. As has been explained above the construction and layout of the lamp operating and control circuit 3 as described above is largely irrelevant to the operation of the invention except in so far as there is a lamp operation monitoring circuit provided or at least some way of identifying or accessing easily fault signals.

The fault detection apparatus 1 includes a microprocessor controller 20 forms a host interface for connection to the lamp operating and control circuit 3 for reception of the fault detection signals from the lamp monitoring circuit 16 and also as a control unit to operate the apparatus. The microprocessor controller 20 is connected to an opto-coupler 21 to external contacts 22. The external contacts 22, in turn, are connected to an externally visible signalling device, not shown.

In normal gas discharge lamps, due to wear and tear over time, the voltage across the contacts 10 rises. Typically the voltage may start at 80 volts optimum and keeps rising until it reaches 120 volts when the phenomenon of cycling occurs. When this happens the gas discharge lamp switches on and off in rapid succession, which is a very undesirable result.

In operation the lamp monitoring circuit 16 senses when the voltage across the lamp 10 strays from a certain level, either due to the lamp cycling or to some other fault on the circuit. When this happens the microprocessor controller 20 sends a high to low signal to the opto-coupler 21 which turns on the opto-coupler 21 which in turn drives the externally visible signalling device. This is a relatively simple way of carrying out the invention.

The microprocessor controller is programmed to analyse the signal received and to carry out the additional operation of switch-off of the lamp when the voltage exceeds some preset level.

Figure 4:
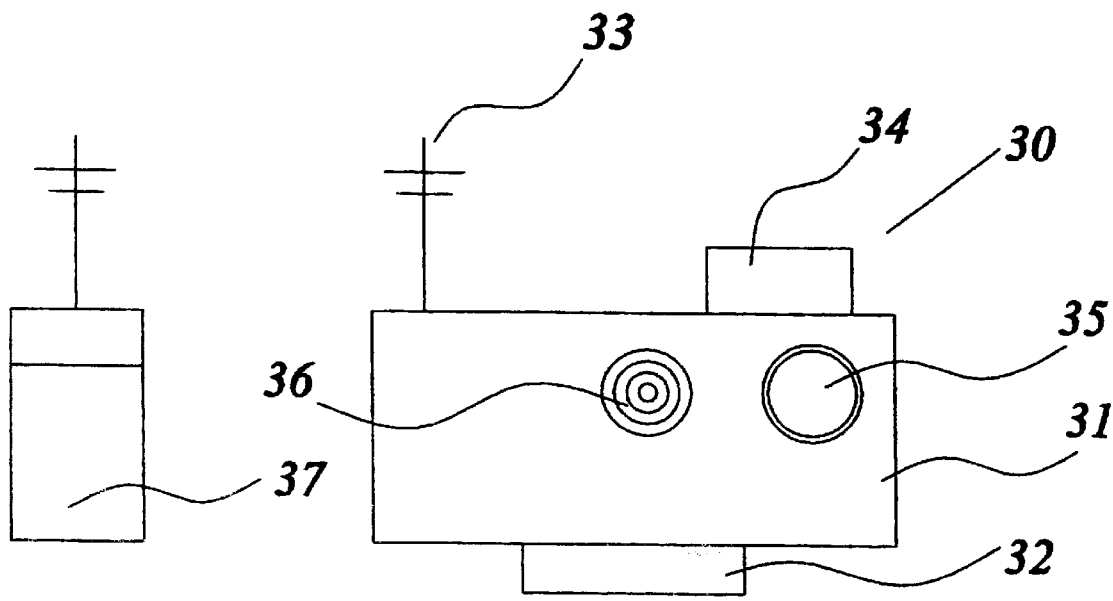
FIG. 4 is a diagrammatic view of an another embodiment of the invention.

Referring to FIG. 4, there is illustrated a fault detection apparatus according to the present invention, namely a plug-in fault detection apparatus 30. The plug-in fault detection apparatus 30 incorporates a casing 31 having an I/O interface 32. Mounted in the casing 31 is a short wave radio transmitter, only the antennae 33 of which is shown. Also included and visible on the exterior of the casing is an externally visible signalling device formed from a signalling beacon 34. An indicator lamp 35 and a light sensor in the form of a photoelectric cell 36 are also provided. Suitable circuitry forming a control unit and connected to the short wave radio, the signalling beacon 34 and the indicator lamp 35 and the photoelectric cell 36 is housed within the casing 31. The construction of such circuitry is largely optional and many arrangements could be used to enable the invention to be carried out. Thus the apparatus and its circuit is described by reference to its function. A host station in this case a hand-held transmit/receive device 37 is provided.

In operation the plug-in fault detection apparatus may be fitted to any lamp control circuit having an I/O interface. The signalling beacon 34 will operate on a fault being detected to provide an indication of the status of the lamp. The indicator lamp 35 will indicate whether the plug-in fault detection apparatus 30 is operable or not, irrespective of whether it is indicating a fault.

The photoelectric cell 36 is provided so as to ensure that the signalling beacon 34 only operates under certain ambient light conditions. Generally speaking this would be daylight, or it may be possibly restricted to certain hours of the day. The photoelectric cell 36 could be used in combination with a time clock or indeed could be replaced by a time clock or any other timer.

The signalling beacon 34 may be so constructed as to give different signals depending on the fault detected such as, for example, intermittent flashing or continuous flashing. Further it is envisaged that the signalling beacon may be so arranged as to provide lights of different colours. The signalling beacon could by use of a different coloured light indicate correct operation of the fault detection apparatus instead of using a separate indicator such as the indicator lamp 35.

Figure 5:
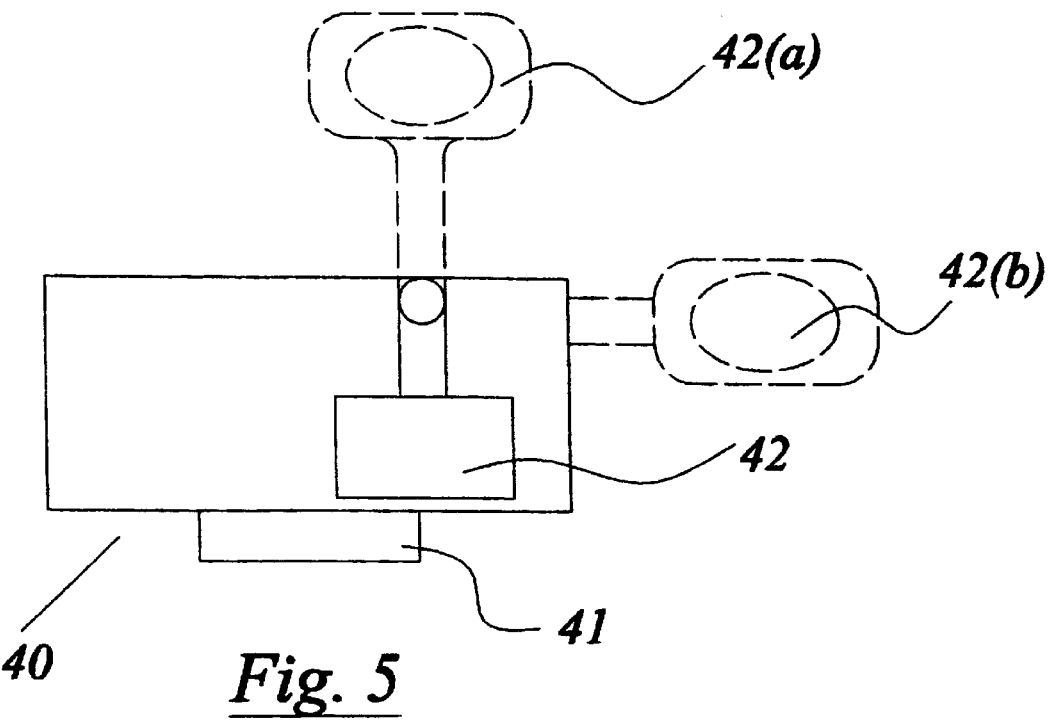
FIG. 5 is a diagrammatic view of a still further embodiment of the invention.

Referring to FIG. 5 there is illustrated a further construction of plug-in fault detection apparatus indicated generally by the reference numeral 40 which has an I/O interface 41 and has an externally visible signalling device in this case a conventional flag 42 which can be operated to assume three positions, two of which are shown by the interrupted lines and identified by the reference letters (a) and (b).

In operation, for example in the position 42 this would indicate that the lamp was operating in the correct mode. In the position illustrated by the reference numeral 42(*a*) this shows a fault is imminent and in the position 42(*b*) it indicates that the lamp is no longer operating.

While in the embodiments described above there has been described a host station in the form of a handheld device, it will be appreciated that any central host station may be used and indeed signals could be sent down the mains wire to a central control unit. However, a hand-held device could be relatively useful in that it allows gradual retro-fitting of the device according to the present invention.

While in the embodiments described above an opto-coupler is used to operate a signalling beacon, equally the beacon may be driven by a simple capacitor arrangement.

It will also be appreciated that any other solid state or electro-mechanical device could be used.

One of the great advantages of using a flag rather than a beacon is that once the flag has been operated then no further power is required until the flag is reset.

It is envisaged that the units would operate in a low power mode.

It will be appreciated for example that the signalling beacon may be provided by any high intensity light source, such as Xenon lamps, halogen lamps, high intensity LEDs or similar devices.

It will be readily appreciated that depending on requirements that the fault detection apparatus of the present invention can provide a relatively unsophisticated report of a fault without any discrimination between types of faults, or can, using suitable programming and for example querying devices, provide considerable information to public lighting operators to optimise the efficiency of the operation of the system.

In the specification the terms "comprise, comprises, comprised and comprising" or any variation thereof and the terms "include, includes, included and including" or any variation thereof are considered to be totally interchangeable and they should all be afforded the widest possible interpretation and vice versa.

The invention is not limited to the embodiment hereinbefore described, but may be varied in both construction and detail within the scope of the claims.

What is claimed is:

1. A fault detection apparatus for a public lighting system of the type having a plurality of lamps, each lamp including an operating and control circuit incorporating fault detection signalling to signal both existing and imminent fault conditions for various portions of the operating and control circuit characterised in that the fault detection apparatus (1) comprises:

a host interface (5) for connection to the lamp operating and control circuit (3) for the reception of fault detection signals;

a control unit (6) for reception of the fault detection signal; and an externally visible signalling device (7) connected to the control unit (6) and operable by the control unit (6) to signal the fault condition.

2. A fault detection apparatus as claimed in claim 1 in which the signalling device (7) is a flag (42).

3. A fault detection apparatus as claimed in claim 1 in which signalling device (7) is a signalling beacon (34).

4. A fault detection apparatus as claimed in claim 1 in which there is provided additional signalling means for sending the fault detection signal to a host control station (37).

5. A fault detection apparatus as claimed in claim 4 in which the additional signalling means provides a short range radio signal for sending the fault detection signal to a remote but relatively near host station (37).

6. A fault detection apparatus as claimed in claim 5 in which the host station (37) is incorporated in a portable device.

7. A fault detection apparatus as claimed in claim 6 in which portable device is a hand held device.

8. A fault detection apparatus as claimed in claim 1 in which the fault detection apparatus (1) is housed in a separate plug in unit (30) for connection to the lamp (2).

9. A fault detection apparatus as claimed in claim 1 in which the control unit (16) includes means for additionally deactivating the lamp (2) on detection of a fault.

10. A fault detection apparatus as claimed in claim 1 in which the control unit (6) includes analysis means for fault detection signals to identify a particular fault and to cause the signalling device (7) to emit a signal indicating the fault.

11. A fault detection apparatus as claimed in claim 1 in which the control unit (6) includes means for deactivating the lamp (2) in response to the particular fault identified.

12. A fault detection apparatus as claimed in claim 1 in which the control unit incorporates an oscillating circuit.

13. A fault detection apparatus as claimed in claim 1 in which the control unit incorporates an opto-coupler (21).

14. A fault detection apparatus as claimed in claim 3 in which the signalling beacon (34) is a high intensity light source (34).

15. A fault detection apparatus as claimed in claim 3 in which the signalling beacon (34) emits a coloured light.

16. A fault detection apparatus as claimed in claim 5 in which the colour changes depending on the fault identified.

17. A fault detection apparatus as claimed in claim 5 in which the control unit (6) includes an additional indicator lamp (36) to signal correct operation of the control unit (6) and the signalling device (7).

18. A fault detection apparatus as claimed in claim 1 in which the control unit (6) includes additional control means to only operate the signalling device (7) during certain times.

19. A fault detection apparatus as claimed in claim 1 in which the control unit (6) includes light sensors (35) to control the level of light during which the signalling device operates.

20. A fault detection apparatus as claimed in claim 1, wherein the control unit is provided with means for measuring the voltage across lamp contacts and means for generating the fault signal when the voltage across the lamp contacts strays from a certain pre-set level.

* * * * *